A. R. BULLOCK.
DRIVING MECHANISM FOR AUTOVEHICLES.
APPLICATION FILED MAY 29, 1907.
1,094,055.
Patented Apr. 21, 1914.
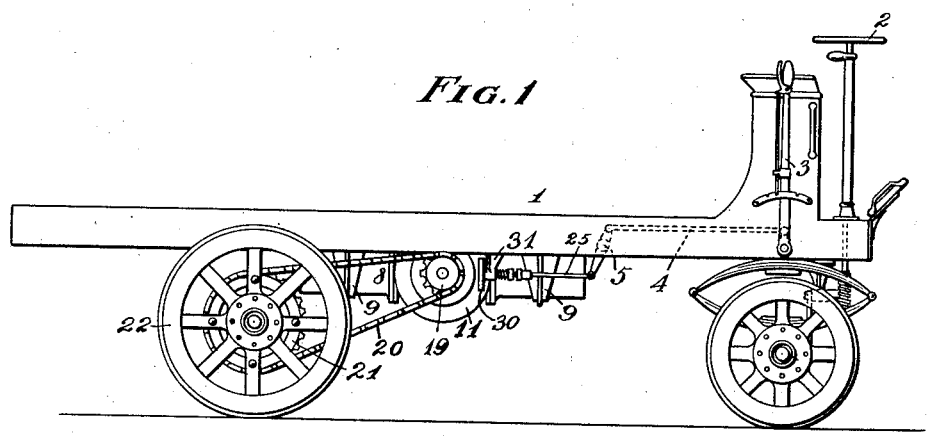
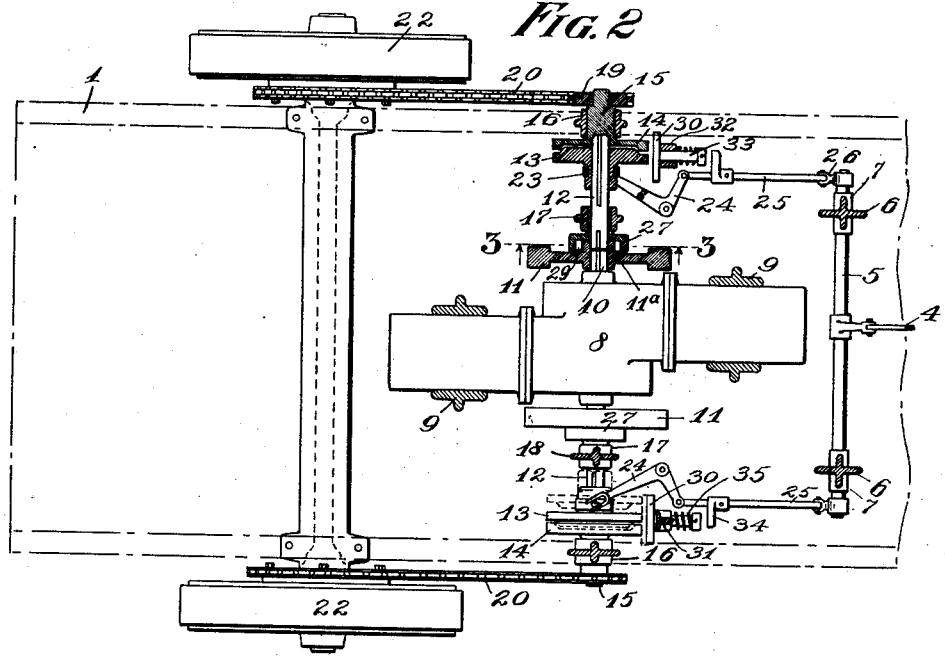
WITNESSES:
Brennan B. West.
Nathan F. Fretter.
INVENTOR,
Arthur R. Bullock
BY
Bates, Fouts & Hull
ATTYS.

UNITED STATES PATENT OFFICE.

ARTHUR R. BULLOCK, OF CLEVELAND, OHIO.

DRIVING MECHANISM FOR AUTOVEHICLES.

1,094,055.

Specification of Letters Patent. Patented Apr. 21, 1914.

Application filed May 29, 1907. Serial No. 376,281.

*To all whom it may concern:*

Be it known that I, ARTHUR R. BULLOCK, residing at Cleveland, in the county of Cuyahoga and State of Ohio, have invented a certain new and useful Improvement in Driving Mechanism for Autovehicles, of which the following is a full, clear, and exact description, reference being had to the accompanying drawings.

My invention relates to auto vehicles and particularly to mechanism for driving the same.

While susceptible of application to various styles of automobiles as now constructed, it is believed that its main field of usefulness resides in connection with the operation of heavy vehicles, such as trucks.

The object of the invention is to provide a very simple and effective mechanism for transmitting motion from the opposite ends of the engine shaft to the opposite wheels of a vehicle and to provide an extremely simple but effective compensating mechanism to permit either of said wheels to travel at greater speed than the other, as when turning a corner; also to provide means, with such mechanism, for permitting the engine to be started and to reverse the drive on said wheels.

Generally speaking, the invention may be defined as consisting of the combinations of elements embodied in the claims hereto annexed.

Referring to the drawings, Figure 1 represents a side elevation of a vehicle having my invention applied thereto. Fig. 2 represents a plan view of a portion of the vehicle shown in Fig. 1, certain parts of the mechanism being shown in section. Fig. 3 represents an enlarged sectional detail on the correspondingly-numbered line of Fig. 2.

Describing the parts by reference numerals, 1 represents a truck, the same being provided with the ordinary steering wheel 2 and clutch-operating lever 3. This lever is pivoted at its lower end and has connected therewith, intermediate of its ends, the link 4 by which a rock shaft 5 may be rotated. Rock shaft 5 is preferably mounted between the side frames of the truck and may be supported by means of metallic hangers 6 depending from the truck and each having a journal sleeve 7 for said shaft.

The engine 8 is mounted beneath the body of the truck, a double engine of the opposed-cylinder type being shown for purposes of illustration. The engine may be conveniently supported by heavy cast metal straps 9, extending around the cylinders thereof and supported from the frame of the truck in any convenient manner. The engine is arranged longitudinally of the vehicle body with its shaft 10 extending transversely of said body, said shaft being provided at opposite sides of the engine with fly wheels 11.

Shaft sections 12 are provided, one at each side of the engine and constituting in effect extensions of shaft 10. Each of said shaft sections 12 is provided at its outer end with a conical friction-clutch member 13, adapted to be thrown into engagement with the complementary clutch member 14 on a stub shaft 15, which may be conveniently supported from the side frame of the vehicle in a journal 16. Shaft sections 12 are supported in journals 17 which may be formed as parts of depending hangers 18 supported by the vehicle frame. Each of the stub shafts 15 is provided at its outer end with a sprocket 19 by means of which and chain 20 and sprocket 21 on the hub of the wheel 22, both of the wheels on opposite sides of the vehicle may be driven directly from the stub shafts. In the construction herein disclosed, there will be no necessity for the employment of counter-shafts and reduction gearing between the engine shaft and the wheels, a sufficient reduction being accomplished by the relative sizes of sprockets 19 and 21.

Each of the clutches 13 is provided with a collar 23 operated by a bell crank lever 24 connected by a link 25 and arm 26 with an end of the rock shaft 5. By operating the lever 3 in the ordinary manner, the clutches 13 may be thrown into engagement with or disengaged from the clutch members 14. But for the necessity of starting and allowing one of the wheels to rotate faster than the other, as when going around a corner, the engine shaft might extend continuously from side to side of the vehicle. Except during these operations, it acts as a continuous shaft from the outer end of one stub shaft 15 to the outer end of the opposite stub shaft. To allow for the latter operation, I employ a ratchet clutch between each end of engine shaft 10 and the adjacent shaft section 12, said clutch being shown in detail in Figs. 2 and 3 as of the roller type. In these views, 27 denotes a flange which is keyed onto the inner end of shaft section 12. This flange is provided in its inner face with a plurality of recesses 28 between which and the hub flange 11ª of fly wheel 11 are interposed the rollers 29. It will be observed that recesses 28 are tapered, the deepest portions of said recesses being of sufficient depth to accommodate the rollers 29 without any driving engagement between the same and the flange 27. When, however, the shaft 10 is turned in the direction of the arrow in Fig. 3, the rollers will bind between the outer surface of hub 11ª and the inclined surfaces of recesses 28, and a driving connection will be made between the ends of shaft 10 and the shaft sections 12, and said shaft and said sections will rotate together as one shaft. In turning a corner, both ends of shaft 10 will be driven at the same rate of speed, and the inner wheel will be driven at the speed of said shaft as modified by the reduction accomplished between sprockets 19 and 21. The outer wheel will revolve faster than the inner wheel, this action being permitted by the coasting of the flange 27, at the side of the engine corresponding to said outer wheel, on the rollers and on the hub flange 11ª.

In starting the engine, the ends of shaft sections 12 will be disconnected from the stub shafts 15, enabling the engine to turn over. When ready to go ahead, the clutch members 13 will be thrown into engagement with clutch members 14 by operating the lever 3, and the various shaft sections will drive as one shaft extending continuously from side to side of the vehicle. Such action will be maintained until necessity arises for one of said wheels to travel faster than the other, whereupon the ratchet clutch compensating mechanism will go into action and will permit relative movement between one end of shaft 10 and the adjacent shaft section 12.

By the employment of the stub shafts 15 and the location of the bearings 16 therefor, the engine is relieved of practically all thrust caused by driving the wheels from the ends of the engine shaft.

With the mechanism above described, I have provided a simple means for reversing the rotation of the stub shafts 15 and of the wheels 22. This means comprises a pair of friction disks 30, each supported adjacent to a pair of clutch members 13 and 14 by a hanger 31 having a bearing sleeve 32 for the shaft 33 of said disk. The disks are at right angles to the planes of said clutch members and are movable parallel to the planes of said clutch members, and are so arranged that, when the clutch members 13 are thrown to their inner limits of movement by the links 4, said disks will be automatically moved into engagement with clutch members 13 and 14 by said links, the clutch member 13 engaging the disk at a greater distance from the center thereof than clutch member 14, whereby reduction of speed on reversal is obtained. The disks may be operated by arms 34 adjustably mounted on links 25 and adapted to engage the ends of shafts 33, springs 35 surrounding said shafts automatically disengaging the disks from the clutch members when the lever 3 is operated to move clutch members 13 outwardly.

Having described my invention, I claim:

1. The combination, with a vehicle, of an engine supported thereby and having its shaft extending transversely of said vehicle, shaft sections in alinement with the ends of said engine shaft, compensating mechanism interposed between said sections and the adjacent ends of the engine shaft, stub shafts supported by the vehicle in alinement with the said shaft sections and each having a clutch member, a pair of wheels, one on each side of said vehicle, connections between the ends of said stub shafts and said wheels, clutch members carried by the former shaft sections, and means for operating the latter clutch members, substantially as specified.

2. The combination, with a vehicle, of an engine supported thereby and having its shaft extending transversely of said vehicle, shaft sections in alinement with the ends of said engine shaft, compensating mechanism interposed between said sections and the adjacent ends of said engine shaft, stub shafts supported by the vehicle in alinement with the said shaft sections, a pair of wheels, one on each side of the vehicle, connections between the ends of said stub shafts and said wheels, and clutch mechanism for connecting and disconnecting the stub shafts and the adjacent shaft sections, substantially as specified.

3. The combination, with a vehicle, of an engine supported thereby and having its shaft extending transversely of said vehicle, a fly wheel on and adjacent to each end of said shaft and having its hub projecting beyond the corresponding end of said shaft, a shaft section on each side of and in alinement with said engine shaft and having its inner end provided with an inwardly projecting flange of greater diameter than said hub flange and provided with inclined recesses, rollers interposed between said flanges and fitted in said recesses, a wheel on each side of said vehicle, and driving connections between the ends of said shaft sections and said wheels, substantially as specified.

4. The combination, with a vehicle, of an engine supported thereby and having its shaft extending transversely of said vehicle, a fly wheel on and adjacent an end of said shaft and having its hub projecting beyond said end, a shaft section in alinement with said engine shaft and having its inner end provided with an inwardly projecting flange of greater diameter than said hub flange and provided with inclined recesses, rollers interposed between said flanges and fitted in said recesses, a wheel, and a driving connection between the said shaft section and said wheel, substantially as specified.

5. The combination, with a vehicle, of an engine supported thereby and having a shaft, a shaft section in alinement with the engine shaft, a wheel, a driving connection between said shaft section and said wheel, clutch mechanism for connecting said shaft section with the engine shaft, and means adapted to engage such clutch mechanism and to reverse thereby the rotation of the shaft section with respect to the engine shaft, substantially as specified.

6. The combination, with a vehicle, of an engine supported thereby and having a shaft, a shaft section in alinement with said engine shaft, a wheel, a driving connection between said shaft section and said wheel, clutch members carried respectively by said engine shaft and said shaft section, means for moving one of said members into engagement with the other, a reversing disk, and means for moving said disk into engagement with both the said clutch members when said members are separated, substantially as specified.

7. The combination, with a vehicle, of an engine supported thereby and having a shaft extending transversely of the vehicle, a shaft section in alinement with said engine shaft, a wheel, a driving connection between said shaft section and said wheel, clutch members on said shaft and said section respectively, one of said members being movable toward and from the other, means for moving the movable clutch member into and out of engagement with the other clutch member, and reversing mechanism adapted to be moved into engagement with both said clutch members by the operation of the means for separating the same, substantially as specified.

8. The combination, with a vehicle, of an engine supported thereby and having a shaft, a shaft section, a wheel, a driving connection between said shaft section and said wheel, clutch members on said shaft and said section respectively, one of said members being movable toward and from the other, means for moving the movable clutch member into and out of engagement with the other clutch member, and reversing mechanism adapted to be moved into engagement with both of said clutch members by the operation of the means for separating the same, substantially as specified.

9. In a vehicle, the combination of an engine having a shaft extending transversely of the vehicle, said shaft extending for a short distance only upon opposite sides of the engine, a pair of shaft sections, one upon each side of the engine and in alinement with the first mentioned shaft, differential clutch mechanism connecting each shaft section with the adjacent end of the engine shaft, a pair of wheels on the vehicle, one upon each side means operatively connecting the outer ends of the shaft sections with the vehicle wheels, and a clutch mechanism inserted in the said connection.

10. In a vehicle, the combination of an engine having a shaft extending transversely of the vehicle, said shaft extending for a short distance only upon each side of the engine, a pair of shaft sections, one upon each side of the engine in alinement with the first mentioned shaft, compensating mechanism between each shaft section and the end of the engine shaft adjacent thereto, and independent of the operation of the front wheels of the vehicle, wheels upon the vehicle, and means connecting the outer ends of the shaft sections with certain of the wheels.

11. In a vehicle having wheels thereon, the combination of an engine having a shaft extending transversely of the vehicle, said shaft extending a short distance only on each side of the engine, a pair of shaft sections, one upon each side of the engine and in alinement with the engine shaft, the inner ends of the shaft sections being provided with inwardly projecting flanges of greater diameter than the shafts and provided with recesses having an inclined wall, rollers interposed between the engine shaft and the flanges, said rollers fitting in the recesses and connections between the outer ends of said shaft sections and certain of the vehicle wheels.

12. In a vehicle, the combination of an engine having a shaft extending transversely of the vehicle, said shaft terminating a short distance beyond each side of the engine, a pair of shaft sections, one upon each side of the engine and in alinement with the engine shaft, a compensating mechanism between the inner end of each shaft section and the adjacent end of the engine shaft, stub shafts in alinement with the shaft sections, clutches connecting the stub shafts and sectional shafts, wheels upon the vehicle and connections between the outer ends of the stub shafts and certain of the wheels.

13. In a vehicle, the combination of an engine having a shaft extending transversely of the vehicle and terminating a short distance beyond the opposite sides of the engine, a pair of shaft sections, one upon each side of the engine and in alinement with the engine shaft, a compensating mechanism between the shaft section and the adjacent end of the engine shaft, stub shafts in alinement with the shaft sections, clutch mechanism connecting the stub shafts and the sectional shafts, a sprocket wheel upon the outer end of each stub shaft, wheels upon the vehicle, certain of said wheels being provided with sprockets, and chains connecting the sprockets upon the wheels and upon the stub shafts.

14. The combination with a vehicle, of an engine supported thereby, and having a shaft extending transversely on the vehicle, said shaft comprising a pair of outer shaft sections and an inner shaft section, a pair of wheels, one on each side of the vehicle, a compensating mechanism interposed between the inner shaft section and the outer shaft sections, a driving connection between the outer ends of the shaft sections and the wheels, said connections having a clutch interposed therein.

In testimony whereof, I hereunto affix my signature in the presence of two witnesses.

ARTHUR R. BULLOCK.

Witnesses:
J. B. HULL,
J. L. TRAUB.